Figure 1:
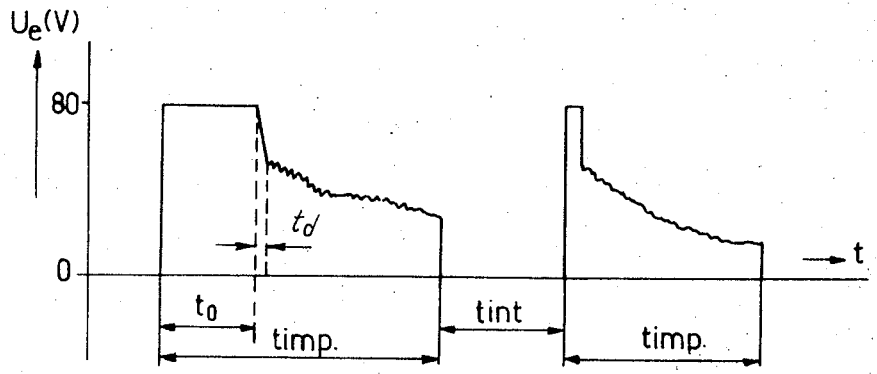

United States Patent [19]
Van Best et al.

[11] 3,746,930
[45] July 17, 1973

[54] APPARATUS FOR DETECTING ARCS

[75] Inventors: Jasper Anton Van Best, Utrecht; Ernst Frederik Avenarius; Jan Willem De Zeeuw, both of Emmasingel, Eindhoven, all of Netherlands

[73] Assignee: U.S. Philips Corporation, New York, N.Y.

[22] Filed: June 14, 1971

[21] Appl. No.: 152,523

[30] Foreign Application Priority Data
June 18, 1970 Netherlands.................. 7008914

[52] U.S. Cl............... 317/31, 219/69 S, 219/69 G, 317/51, 324/54, 317/27 R
[51] Int. Cl............................................ H02h 7/00
[58] Field of Search.................. 324/54; 307/136, 307/157, 235; 219/69 S, 69 G, 69 R, 69 C, 69 P; 317/51, 31, 27 R, 53, 36 TD; 328/127

[56] References Cited
UNITED STATES PATENTS

| | | | |
|---|---|---|---|
| 3,087,044 | 4/1963 | Inove................................ | 219/69 P |
| 3,586,912 | 6/1971 | Sennowitz........................... | 317/51 |
| 3,609,21 | 9/1971 | Kauffman.......................... | 219/69 C |
| 3,591,851 | 7/1971 | Drushel............................. | 307/235 |
| 3,662,143 | 5/1972 | Davis................................. | 219/69 S |
| 3,434,011 | 3/1969 | Zocholl........................ | 317/36 TD |

*Primary Examiner*—James D. Trammell
*Assistant Examiner*—Harvey Fendelman
*Attorney*—Frank R. Trifari

[57] ABSTRACT

Apparatus for detecting the occurrence of an arc during a spark erosion process is based upon the principle that the noise component of the voltage across the discharge gap disappears when an arc occurs. The noise voltage is detected and compared with a reference voltage in a discriminator circuit. A signal from a logic circuit is also applied to the discriminator which determines the presence of a current through, and of a voltage across, the spark discharge gap.

16 Claims, 6 Drawing Figures

Patented July 17, 1973

3,746,930

2 Sheets-Sheet 1

INVENTORS
JASPER A. VAN BEST
ERNST F. AVENARIUS
JAN W. DE ZEEUW

BY

AGENT

INVENTORS
JASPER A. VAN BEST
ERNST F. AVENARIUS
JAN W. DE ZEEUW
BY
AGENT

APPARATUS FOR DETECTING ARCS

This invention relates to an apparatus for the detection of arcs during a spark-erosion process in which spark discharges are produced in a discharge space constituted by a workpiece and a tool electrode which are connected to a supply source.

When removing particles of material from an electrically conductive workpiece by means of spark erosions, arcs may occur instead of regular sparks, with consequent damage to the workpiece and to the tool electrode.

In the case of arcs the build-up time of the voltage pulse between the workpiece and the tool electrode differs from that in sparks. In addition, the values of the currents through, and the voltages across, the discharge space are different for arcs and for sparks. Arcs may be detected by means of detection systems which are based on the said physical phenomena. The system parameters of such detection systems depend, however, on the setting of the power supply source which supplies the discharge pulses and on the material or materials of the workpiece and the tool electrode. Hence, these detection systems are closely tied to the specific spark erosion process for which they have been designed and hence are not suitable for general use.

It is an object of the invention to provide an apparatus for the detection of arcs which may be used with any spark erosion process and which rapidly and accurately indicates whether or not arcs occur. The apparatus according to the invention is characterized in that the discharge space is connected to the input terminals of a noise detection circuit for detecting the noise component of the voltage across the discharge space. The output terminals of the noise detection circuit in turn are connected to the input circuit of a discriminator arrangement, to which input circuit there is also connected a reference voltage supply. This apparatus utilizes a physical property of arcs which hitherto has not been used for arc detection, namely, the disappearance of the high-frequency noise component of the voltage across the discharge space as soon as arcs occur. In the discriminator circuit the detected noise voltage is compared with a reference voltage. The output voltage of the discriminator circuit provides an indication of the occurrence of arcs.

In order to enable an arc to be detected by the absence of the noise voltage, it must be ascertained whether a current flows through, and a voltage is set up across, the discharge space. For this purpose, according to a further feature, the apparatus includes a logic circuit. To the inputs of the logic circuit there may be supplied the voltage across, and the current through, the discharge space. The output terminals of the logic circuit are connected to the output terminals of the noise detection circuit.

According to a further feature of the apparatus according to the invention, there is connected between the output terminals of the noise detection circuit a switch, the control circuit of which is connected to the output terminals of the logic circuit. This prevents that in the case of small time intervals the noise voltage pulses should be added together and the transient pulses of the supply source should be transmitted.

The discriminator circuit preferably is an operational amplifier having two input terminals, one of which is connected to an output terminal of the noise detection circuit and the other input terminal is connected to a reference voltage supply. This enables an accurate and temperature-independent detection threshold to be obtained.

The apparatus according to the invention may form part of a protection device for suppressing arcs in a spark erosion system. For this purpose, the output terminals of the discriminator circuit may be connected to a pulse counter. After a predetermined number of pulses have occurred within a given time interval, the pulse counter may deliver a signal by means of which, for example, the supply source and the discharge space are disconnected from one another. As an alternative, the output pulses of the discriminator circuit may be applied to an integrating network the output voltage of which controls a relay capable of switching off the supply source.

Figure 2:
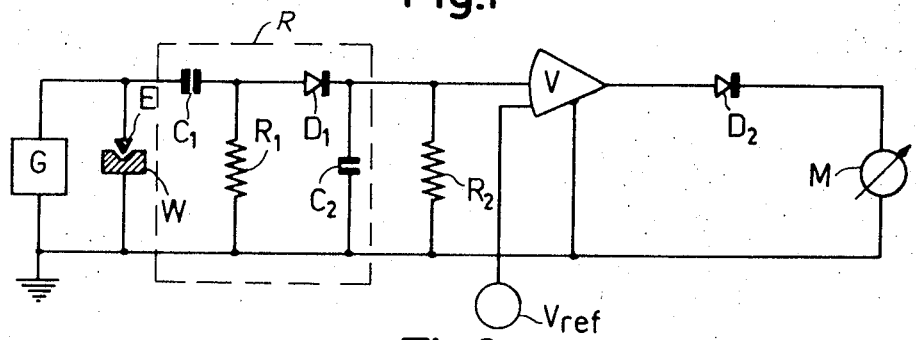
Figure 3:
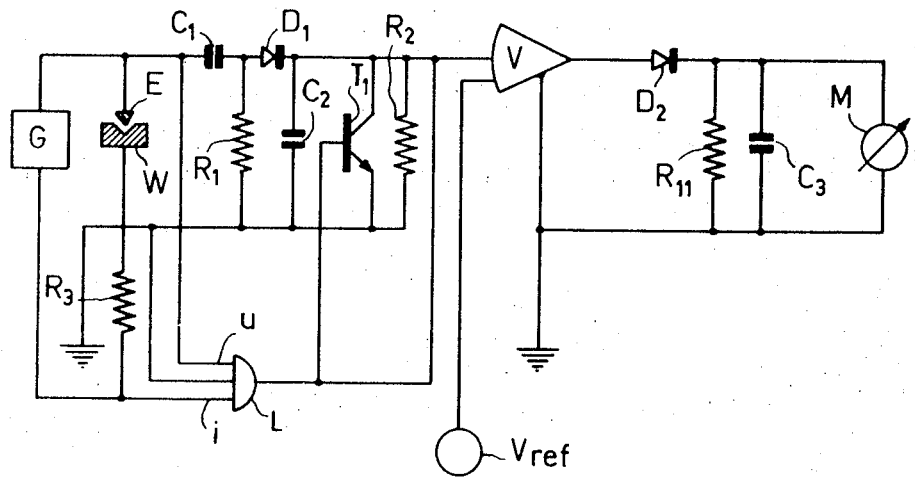
Figure 4:
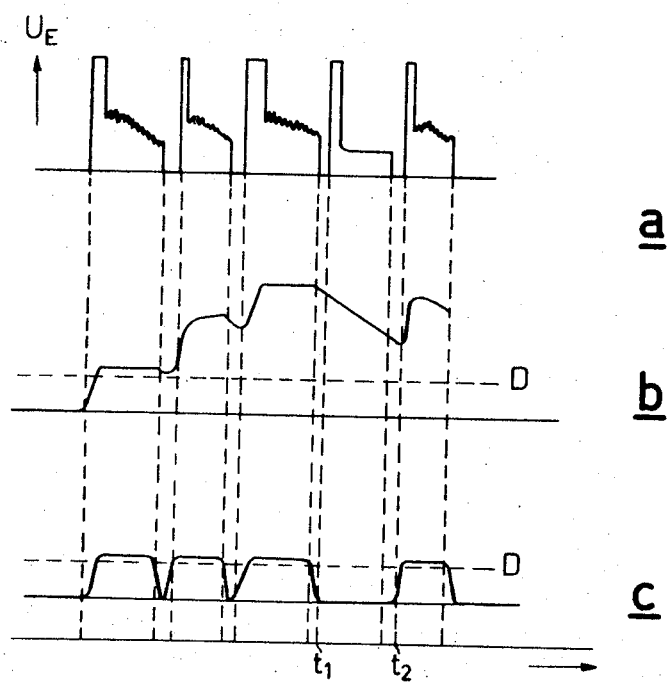
Figure 5:
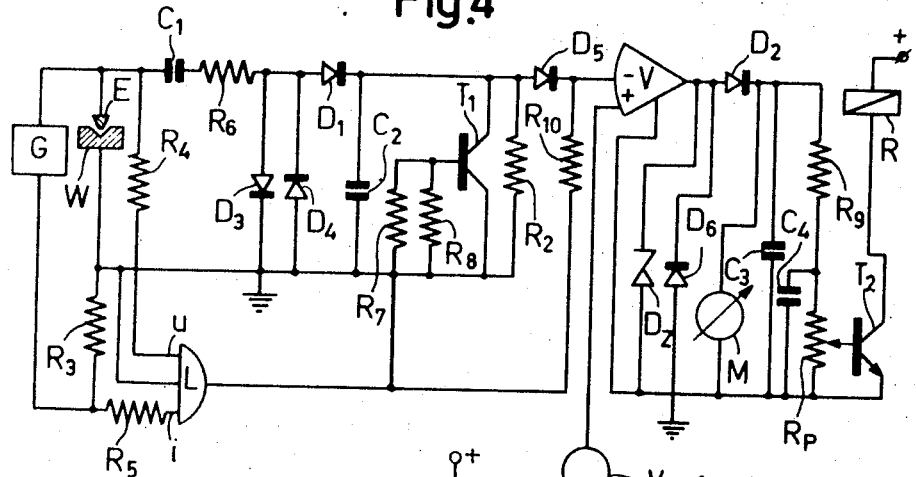
Figure 6:
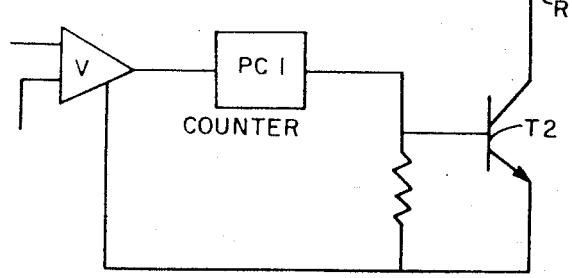

Embodiments of the invention will now be described, by way of example, with reference to the accompanying diagrammatic drawings, in which:

FIG. 1 shows the waveform of the voltage set up between a tool electrode and a workpiece in the case of a spark, FIG. 2 shows schematically an apparatus according to the invention, FIG. 3 shows schematically an apparatus according to the invention including a logic circuit, FIG. 4 shows waveforms illustrating how, in the case of small time intervals, the detected noise voltage pulses may be added together, FIG. 5 is a complete circuit diagram of a practical embodiment of the apparatus according to the invention, and FIG. 6 illustrates a modified portion of the apparatus shown in FIG. 3.

Referring now to FIG. 1, the voltage of the tool electrode, with the workpiece connected to ground and in the case of a normal spark discharge, is indicated by $U_e$. Time $t$ is plotted along the horizontal axis. The further symbols have the following meanings:

$t_o$: breakdown time, $t_{imp}$: the pulse duration of the pulses supplied by a pulse generator, $t_{int}$: the time interval between two successive pulses, $t_{imp} - t_o$: the spark time, $t_{imp} + t_{int}$: the period, $t_d$: the decay time.

Instead of regular sparks over the entire erosion area arcs will sometime occur, presumably owing to fouling of the ionization channel by particles from the electrode, the workpiece or the dielectric.

The occurrence of arcs may be perceived not only by the production of a strong local light-emitting arc, but also by the frequent occurrence of short-circuits between the tool electrode and the workpiece. As a result, the tool electrode is slightly retracted, and subsequently the striking of the sparks or arcs is started again. However, before retracting the tool electrode, the workpiece and the tool electrode may have already suffered heavy damage.

There are, however, further perceivable characteristics which may enable rapid protective action.

a. The decay time $t_d$ is longer in the case of arcs than in sparks. Experiments have shown that in sparks $t_d \leq 20$ nanoseconds and in arcs $t_d \approx 300$ nanoseconds. However, owing to capacitive and inductive disturbances such short periods cannot readily be measured. To permit good observation of the phenomenon a very fast oscilloscope is required. A further difficulty is that an arc which occurs only after several sparks have been struck is not perceived.

b. The mean breakdown time $\bar{t}_o$ is shorter in arcs than in sparks. Timely detection of the difference is fundamentally impossible since $t_o$ varies randomly between 0.1 $\bar{t}_o$ and 100 $\bar{t}_o$. True, in the case of heavy arcs $\bar{t}_o$ is substantially reduced to zero, but in this event protective action is meaningless.

c. The maximum electric current in arcs is larger by from 10 to 20 percent than that in sparks. A disadvantage of a detection system based on this phenomenon is that the current limitation set in the spark erosion system and the duration of the intervals and of the pulses must be taken into account. Moreover, the mean current does not give a satisfactory indication of the occurrence or non-occurrence of arcs owing to the large fluctuations in breakdown time. Further, the maximum current itself does not provide a satisfactory indication because it cannot be distinguished from a short-circuit current.

d. The arc voltage is lower than the spark voltage. However, the spark voltage depends on the materials of the tool electrode and the workpiece and moreover fluctuates.

The detection methods which are based on the properties enumerated in the paragraphs a) to d) above all have the disadvantage that they can only be used in the case of a given setting of the supply source and with given materials of the electrode and of the workpiece. According to the invention, we make use of the fact that the noise voltage present in a spark discharge does not occur in an arc discharge. The detection method based on the aforesaid noise measurement does not have any of the aforementioned disadvantages.

FIG. 2 shows schematically an apparatus according to the invention. In this figure, reference numeral E denotes the tool electrode and W the workpiece. A pulse generator G produces electric discharges between the workpiece and the tool electrode. As FIG. 1 shows, high-frequency noise will be superimposed on the electrode voltage when the electric discharges are spark discharges. When arc discharges occur, however, the high-frequency noise is absent. In a noise detection circuit R any noise voltage which may be present is separated from the electrode voltage by a differentiating network $R_1 C_1$. The noise voltage is rectified by a diode $D_1$. Voltage pulses are produced across a load resistor $R_2$.

The voltage across the resistor $R_2$ is processed in a discriminator circuit V. The voltage across the resistor $R_2$ is applied to one of the inputs of the discriminator circuit and in this circuit it is compared with the voltage from a reference voltage supply $V_{ref}$. The discriminator circuit will deliver an output pulse only when the voltage pulse across $R_2$ has a given minimum value. The discriminator circuit may be an appropriately biassed transistor. Such a minimum detector, however, has the following disadvantages:

a high sensitivity to temperature,
a change in the level involves a change in the direct-current setting of the transistor and consequently in current setting of the transistor and consequently in the amplification and the dynamics,
the detection threshold is determined by the $I_b/V_{be}$ characteristic of the transistor and is not sufficiently well defined.

The use of a discriminator circuit in the form of an operational amplifier obviates the said disadvantages.

The pulses transmitted by the operational amplifier V are rectified by a diode $D_2$ and may be detected, for example, by a voltmeter M.

To detect an arc it must be ascertained whether noise is absent in the presence of current and voltage. For this purpose the apparatus includes a logic circuit L, as is shown in FIG. 3. This circuit has two inputs and one output. The voltage across the tool electrode and the workpiece is applied to the input $u$ and the current between the tool electrode and the workpiece is supplied to the input $i$. A positive voltage is always set up at the output of the logic circuit unless both input voltages differ from zero, i.e., when the current between the workpiece and the tool electrode and the voltage across the workpiece and the tool electrode both are not zero.

The output of the logic circuit is connected to that input of the operational amplifier to which is also applied the voltage across the resistor $R_2$. The operational amplifier will deliver output pulses only when the sum of the voltage across $R_2$ and of the output voltage of the logic circuit falls below a given value, in other words, when there is both a current between the workpiece and the tool electrode and a voltage across them, and when, moreover, there is no noise.

In the case of small time intervals between the pulses the presence of the stray capacitance $C_2$ gives rise to the possibility that there may be added to a pulse some part of the preceding pulse, the so-called "pile-up" effect. This is illustrated in FIG. 4 in which time $t$ is plotted along the horizontal axis and the voltage across the resistor $R_2$ is plotted along the vertical axis. FIG. 4a shows the pulses which appear at the tool electrode. FIG. 4b shows how the detected pulses, i.e., the pulses set up across the resistor $R_2$, are added to one another. The addition of the pulses results in a voltage across the resistor $R_2$ that remains greater than the detection threshold indicated by a broken line D. Owing to the "pile-up" effect the arc which occurs in the time interval $t_1 - t_2$ is not detected.

In the apparatus shows in FIG. 3, "pile-up" is prevented by the use of a fast linear gate in the form of an npn transistor $T_1$ connected in common emitter configuration without a fixed collector voltage. The base of $T_1$ is connected to the output of the logic circuit L. In the absence of a current through and/or a voltage across the discharge space, the logical voltage and hence the base of $T_1$ is positive so that each positive signal appearing at the collector of $T_1$ is short-circuited. If there is both a current through, and a voltage across, the discharge space, the base voltage of $T_1$ is zero so that $T_1$ is cut off and the noise signal is transmitted. The stray capacitance $C_2$ is discharged in a few nanoseconds after each spark. FIG. 4c shows the pulses which are produced across $R_2$ with the transistor $T_1$ included in the circuit. During the time interval $t_1 - t_2$ the voltage is below the detection threshold D. Thus an arc which occurs in this time interval will now be detected.

An additional advantage of the use of the linear gate is that it short-circuits the transient pulses of the pulse generator. The frequencies of these transient pulses lie within the frequency range of the noise so that, in the absence of the linear gate, these transient pulses would be perceived as noise.

The combination of the logic circuit and the circuit element $T_1$ in the apparatus shown in FIG. 3 may obviously be replaced by a combination of another logic circuit and another linear gate, provided that this combination is selected so that the stray capacitance $C_2$ is discharged whenever the current between the tool electrode and the workpiece and the voltage across them do not simultaneously differ from zero.

The pulses delivered by the operational amplifier may be applied to a pulse counter, as shown in FIG. 6, which in turn may be connected to a protective circuit including a transistor $T_2$ and a relay R such that the connection between the supply source and the discharge space is broken when the number of pulses per unit of time exceeds a given value. Alternatively, the voltage delivered by the operational amplifier may be integrated (see FIG. 3). The integrated voltage, i.e., the voltage across a capacitor $C_3$, may in this case be used to switch a relay. This relay may again form part of a circuit for protecting the spark erosion system.

FIG. 5 shows schematically an embodiment of an apparatus according to the invention which includes a relay.

In order to obtain a larger electric control quantity for energizing the relay, the latter may be connected in the output circuit of an amplifier. In FIG. 5 the amplifier comprises a transistor $T_2$. Obviously several transistors may be connected in series and also different amplifier elements may be used.

By applying the control voltage to the amplifier element through a potentiometer $R_P$ the level at which the relay is energized may be adjusted.

Two diodes $D_3$ and $D_4$ connnected in inverse parallel have been included to prevent the occurrence of high voltage peaks. A series resistor $R_6$ limits the peak current.

In the apparatus of FIG. 3, $C_1$ is charged through $R_1$ at the beginning of the breakdown time. Consequently a peak current of a few amperes may begin to flow, with the result that the logic circuit has an output voltage of 0 volts, so that the transistor $T_1$ is cut off and the signal is transmitted. This may be prevented by reducing the peak current to a value below the perception threshold of the logic circuit. This is realized by omitting $R_1$, enlarging $R_6$ and matching $C_1$. Owing to the stray diode capacitances, an increase in the value of $R_6$ results in a decrease in the detection efficiency. Hence an intermediate solution is chosen by leaving $R_6$ unchanged and decreasing the time constant by a factor of 10 by decreasing $C_1$. The time in which the current exceeds the detection threshold of the logic circuit will then be so short that the logic circuit does not respond to the said peak current.

If no current flows through the discharge space, and/or no voltage is set up across it, the logic circuit delivers a positive output voltage. Consequently the stray capacitance $C_2$ would be charged, with the result that the detection threshold is increased by the voltage across $C_2$. This is prevented by the inclusion of an additional diode $D_3$.

A diode $D_6$ which is connected in parallel with a Zener diode $D_z$ is included to prevent the setting up of negative voltages across the meter M.

The pulses transmitted by the operational amplifier V are rectified by the diode $D_2$ and integrated by a resistor $R_9$ and a capacitor $C_4$.

In a practical embodiment of the apparatus shown in FIG. 5, the resistors $R_2$, $R_3$, $R_4$, $R_5$, $R_6$, $R_7$, $R_8$, $R_9$ and $R_{10}$ had the values 10K Ω, 0.1 Ω, 3.9k Ω, 3.9k Ω, 68 Ω, 100 Ω, 100 Ω, 680 Ω and 10k Ω respectively, and the potentiometer $R_p$ had a value of 10k Ω. The capacitances of the capacitors $C_1$, $C_3$ and $C_4$ were 47 pF, 0.1 μF and 1 μF respectively. The diodes $D_1$, $D_2$, $D_5$ and $D_6$ were germanium diodes of the type OA90. The diodes $D_3$ and $D_4$ were silicon diodes. The Zener voltage of the Zener diode $D_z$ was 5.3 volts. The npn transistors $T_1$ and $T_2$ were of the types MM71 and BC 109, respectively.

What is claimed is:

1. EDM apparatus having means for the detection of arcs during a spark erosion process in which spark discharges are produced in a discharge space constituted by a workpiece and a tool electrode comprising, means for connecting said workpiece and tool electrode to a supply source, means connecting the discharge space defined by said workpiece and electrode to the input terminals of a noise detection circuit for detecting the noise component of the voltage developed across the discharge space during a spark erosion operation, a discriminator circuit, means connecting the output terminals of the noise detection circuit to the input circuit of said discriminator circuit, a reference voltage supply, and means connecting the input circuit of the discriminator circuit to said reference voltage supply.

2. Apparatus as claimed in claim 1 further comprising a logic circuit having input terminals coupled to receive the voltage set up across, and the current flowing through, the discharge space, and means connecting the output of the logic circuit to the output terminals of the noise detection circuit.

3. Apparatus as claimed in claim 2 further comprising a controlled switch connected between the output terminals of the noise detection circuit, and means connecting a control circuit of the switch to the output terminals of the logic circuit.

4. Apparatus as claimed in claim 1 wherein the discriminator circuit comprises an operational amplifier having one input terminal connected to an output terminal of the noise detection circuit and the other input terminal connected to said reference voltage supply.

5. Apparatus as claimed in claim 1 with a protection device for suppressing arcs during a spark erosion process including an apparatus as claimed in any of the preceding Claims, and comprising a switching device for disconnecting the supply source from the workpiece and electrode, and means connecting the output terminals of the discriminator circuit to said switching device for switching off the supply source when an arc is detected.

6. A protection device as claimed in claim 5 further comprising a pulse counter with its input connected to the output terminals of the discriminator circuit and its output coupled to control said switching device.

7. A protection device as claimed in claim 5 further comprising an integrating network with an input circuit connected to the output terminals of the discriminator circuit and an output circuit, said switching device comprising a relay connected to the output circuit of the integrating network.

8. Apparatus as claimed in claim 1 further comprising a gating circuit having an input and an output, means for coupling first and second signals to said gating circuit input that are determined respectively by the voltage across and the current flowing through the discharge space, and means connecting the gate output to the output terminals of the noise detection circuit in a manner such that the discriminator circuit is jointly controlled by the gate circuit and the noise detection circuit.

9. Apparatus as claimed in claim 8 wherein the discriminator circuit comprises an operational amplifier having one input terminal connected to an output terminal of the noise detection circuit and a second input terminal connected to said reference voltage supply.

10. Apparatus as claimed in claim 8 further comprising arc suppression means including a switching device for controlling the supply of electric energy from the supply source to the discharge space, and means connecting the output of the discriminator circuit to an input of the switching device whereby the switching device is operated to block the energy flow to said discharge space when the discriminator output signals the presence of an arc across said discharge space.

11. Apparatus as claimed in claim 10 wherein said last-named connecting means comprises an integrating network coupled between the output of the discriminator circuit and the input of the switching device.

12. Apparatus as claimed in claim 8 further comprising a controlled switching element connected across the output terminals of the noise detection circuit, and means connecting a control terminal of the switching element to the output of the gating circuit whereby the condition of the gating circuit controls the state of the switching element.

13. Apparatus as claimed in claim 8 wherein said noise detection circuit comprises an RC differentiating network and a diode coupling said RC network to the input circuit of the discriminator circuit.

14. A spark erosion apparatus having means for detecting the presence of an arc between a workpiece and a tool electrode comprising, an electric power supply coupled to the workpiece and tool electrode for producing electric spark discharges across the gap formed by the workpiece and tool electrode, first means connected to the workpiece and tool for detecting the noise component of the gap voltage, second means for detecting the presence or absence of a current flow across said gap, and control means coupled to said first and second detecting means for producing a control signal determined by the noise voltage and the gap current.

15. Apparatus as claimed in claim 14 further comprising a controlled switching element responsive to said second detecting means and connected in circuit with said first detecting means to control the level of the noise voltage as a function of the presence or absence of gap current.

16. Apparatus as claimed in claim 14 further comprising third means connected to the workpiece and tool electrode for detecting the gap voltage, and means for coupling the output of said third detecting means to the control means so that said control signal is further determined by the gap voltage.

* * * * *